US011561810B2

(12) United States Patent
Moghaddam et al.

(10) Patent No.: US 11,561,810 B2
(45) Date of Patent: Jan. 24, 2023

(54) AUTOMATED COMMAND ASSISTANCE FOR A CLOUD SERVICE

(71) Applicant: MICROSOFT TECHNOLOGY LICENSING, LLC., Redmond, WA (US)

(72) Inventors: Roshanak Zilouchian Moghaddam, Seattle, WA (US); Neelakantan Sundaresan, Bellevue, WA (US); Jason Shaver, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 106 days.

(21) Appl. No.: 16/246,440

(22) Filed: Jan. 11, 2019

(65) Prior Publication Data
US 2020/0150985 A1 May 14, 2020

Related U.S. Application Data

(60) Provisional application No. 62/758,690, filed on Nov. 11, 2018.

(51) Int. Cl.
*G06F 9/451* (2018.01)
*G06F 9/455* (2018.01)
*H04L 41/0803* (2022.01)
*H04L 41/08* (2022.01)
*G06F 16/838* (2019.01)

(52) U.S. Cl.
CPC .......... *G06F 9/453* (2018.02); *G06F 9/45512* (2013.01); *G06F 16/838* (2019.01); *H04L 41/0803* (2013.01); *H04L 41/0879* (2013.01)

(58) Field of Classification Search
CPC .... G06F 9/453; G06F 16/838; G06F 9/45512; H04L 41/0803; H04L 41/0879
See application file for complete search history.

(56) References Cited

U.S. PATENT DOCUMENTS

| | | | | |
|---|---|---|---|---|
| 8,661,001 | B2 * | 2/2014 | Eliashberg | H04L 67/26 707/694 |
| 2004/0117380 | A1 | 6/2004 | Perrow | |
| 2010/0179833 | A1 * | 7/2010 | Roizen | G16H 10/60 705/3 |
| 2011/0119163 | A1 * | 5/2011 | Smith | G06Q 40/12 705/30 |
| 2011/0225273 | A1 * | 9/2011 | Fong | H04L 41/0843 709/221 |

(Continued)

OTHER PUBLICATIONS

"International Search Report and Written Opinion Issued in PCT Application No. PCT/US19/058684", dated Feb. 11, 2020, 13 Pages.

*Primary Examiner* — Mark D Featherstone
*Assistant Examiner* — Dustin D Eyers

(57) ABSTRACT

An automated command assistance tool is provided for a browser-enabled command line interface of a cloud service. The automated command assistance tool provides examples illustrating the correct syntax for commands used to manage the resources of a cloud service. The command assistance tool learns the syntax of a command from usage patterns found in telemetric data, scripts and user documentation and forms templates containing a command's usage pattern and related information. The templates are used to generate examples that respond to a user query for assistance with usage of a particular command.

17 Claims, 8 Drawing Sheets

(56) References Cited

U.S. PATENT DOCUMENTS

| | | | |
|---|---|---|---|
| 2012/0102215 A1* | 4/2012 | Catrein | H04N 21/8355 |
| | | | 709/231 |
| 2012/0150939 A1 | 6/2012 | Zaifman et al. | |
| 2015/0286732 A1* | 10/2015 | Huang | G06F 16/9535 |
| | | | 707/722 |
| 2017/0109356 A1* | 4/2017 | Sawal | G06F 16/3322 |
| 2017/0270091 A1 | 9/2017 | Singh et al. | |
| 2018/0006885 A1 | 1/2018 | Eliseo et al. | |

* cited by examiner

```
$ az find vm create
I'm an AI robot; Here are the most common ways to use [az vm create]

Create an Azure Virtual Machine.
az vm create --resource-group MyResourceGroup --name MyVirtualMachine Create a default Ubuntu VM with automatic SSH authentication
az vm create -n MyVM -g MyResourceGroup --image UbuntuLTS Create a default Windows Server VM with a private IP address
az vm create -n MyVM -g MyResourceGroup --public-ip-address "" --image Win2012R2DataCenter
```

*FIG. 2A*

```
$ az find vm
I'm an AI robot; Here are the most common ways to use [az vm ]

Get the details of a VM.
az vm show --name MyVirtualMachine --resource-group MyResourceGroup List details of Virtual Machines.
az vm list --output table Show encryption status.
az vm encryption show --name MyVirtualMachine --resource-group MyResourceGroup
```

*FIG. 2B*

234 — $ az group list | head

236 — 
| Name | Location | Status |
| --- | --- | --- |
| clirg | westus | Succeeded |
| clirg1 | westus | Succeeded |

238 — $ az find vm create

240 — I'm an AI robot; Here are the most common ways to use [az vm create], personalized based on your existing resources and usage. For information on personalization: run "as ask"

242 — Create an Azure Virtual Machine.
az vm create –g clirg -n webVM1

244 — Create a default Ubuntu VM with automatic SSH authentication
az vm create –n webVM1 -g clirg –image UbuntuLTS 246 — Create a default Windows Server VM with a private IP address
az vm create –n webVM1 -g clirg –public-ip-address "" --image Win2012R2DataCenter

*FIG. 2C*

```
                         300
                          ⌇
┌─────────────────────────────────────────────────────────┐
│                                                         │
│  {                                                      │
│ 302                                                     │
│     ⌒ "tag": [                                          │
│           "cli",                                        │
│           "azure"                                       │
│ 304                                                     │
│     ⌒ ],                                                │
│ 306   "answer": "Manage Linux or Windows virtual machines.", │
│     ⌒ "children": [                                     │
│           "1290",                                       │
│           "1291",                                       │
│           "1292",                                       │
│           "1293",                                       │
│           "1294",                                       │
│           "1295",                                       │
│           "1296",                                       │
│           "1297",                                       │
│           "1298",                                       │
│           "1299",                                       │
│           "1300",                                       │
│           "1301",                                       │
│           "1302",                                       │
│           "1303",                                       │
│           "1304",                                       │
│           "1305",                                       │
│           "1306",                                       │
│           "1307"                                        │
│ 308 ⌒ ],                                                │
│        "question_keywords": [                           │
│           "az vm"                                       │
│ 310    ],                                               │
│ 312 ⌒ "id": "1308",                                     │
│     ⌒ "question": "az vm",                              │
│ 314 ⌒ "link": "https://docs.microsoft.com/en-us/cli/azure/ │
│  2018-03-01-hybrid/vm"                                  │
│     },                                                  │
│                                                         │
└─────────────────────────────────────────────────────────┘
```

*FIG. 3A*

```
330
{
332 ⌒ "tag": [
            "cli"
334 ⌒   ],
        "answer": "Get the details of a VM.\r\n``azurecli\r\naz vm show\t--name -n\r\n\t\t--resource-group -g\r\n\t[--show-details -d]\r\n\t\t``",
336 ⌒   "question_keywords": [
            "az vm show",
            "show",
            "details",
            "resource",
            "query"
        ],
338 ⌒   "link": "",
340 ⌒   "id": "1290",
342 ⌒   "question": "az vm show --show-details --name MyVm --query [0] --resource-group MyResourceGroup"
    },
```

*FIG. 3B*

AUTOMATED COMMAND ASSISTANCE FOR A CLOUD SERVICE

CROSS-REFERENCE TO RELATED APPLICATION

This application claims the benefit of U.S. Provisional Application No. 62/758,690, filed on Nov. 11, 2018.

BACKGROUND

A command line interface is a user interface in which a user enters commands in the form of a string of text characters. The command line interface is a text-based interface in which the commands are manually typed. The command line interface accepts commands in a designated input field which are then executed by a command line interpreter. This type of user interface is advantageous over a graphical user interface (GUI) where a user uses a mouse or fingers to click images of icons to access files or programs and/or to execute various operations. The command line interface is faster and more efficient than a GUI since it is composable, that is several tasks can be specified in a single text string thereby eliminating numerous interactions with the GUI.

The use of a command line interface requires a user to be familiar with the commands supported by the command line interface and the correct syntax of the commands. The availability of good reference documentation for the commands may be limited. This is often a problem where there are a large number of commands with various sub-commands and parameters which may be used in numerous ways.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A command assistance tool is provided for a browser-enabled command line interface of a cloud service. The command assistance tool learns the syntax of a command from usage patterns found in telemetric data, scripts and user documentation and forms templates based on the usage patterns. There may be several templates for a command where each template represents a different usage pattern with a unique combination of subcommands and/or parameters and/or parameter values. The templates are used to generate examples that respond to a user query for assistance in using a particular command. A weighted elastic search is used to search for templates having a close similarity to fields in the template with the target command at issue. The templates are then used to format examples of the usage of a command which is sent back to the user.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIGS. 2A-2C are schematic diagrams illustrating exemplary command interactions in the cloud shell.

FIGS. 3A-3B illustrate exemplary templates representing a command usage pattern formatted as a JSON object.

DETAILED DESCRIPTION

Overview

The subject matter disclosed herein pertains to a command assistance tool for a browser-enabled command line interface of a cloud service. The command assistance tool provides examples illustrating the correct syntax for a command used to manage resources of a cloud service. A command may include subcommands and/or parameters which may not be known by a user. The command assistance tool provides a fast and convenient means to obtain examples illustrating the correct usage especially when there is limited documentation. A cloud service may have a vast amount of commands with numerous subcommands and/or parameters making it difficult for a user to remember the correct syntax needed to perform a function.

The command assistance tool learns from usage patterns of a command in combination with different subcommands, parameters and parameter values. These usage patterns may come from script programs that use the commands, telemetric data, and user documentation. The usage patterns are used to form templates for the more frequently used commands. There may be multiple templates for a command where each template has a different combination of subcommands and/or parameters and/or parameter values. Default parameter values are learned from the documentation and are included in the templates. Personalized values for the parameters may be learned from telemetric data and included in the templates.

The templates are stored in a repository and utilized to create examples. In one aspect, the templates are formed as JSON objects that are retrieved using a weighted elastic search. A weighted elastic search is used to select those templates that are closely relevant to different fields in the JSON object that are more likely to relate to the intended command usage. The templates are then used to generate examples illustrating the correct syntax needed to invoke the command.

Attention now turns to a further discussion of the system, devices, components, and methods utilized in the machine learning comparison tool.

System

Figure 1:
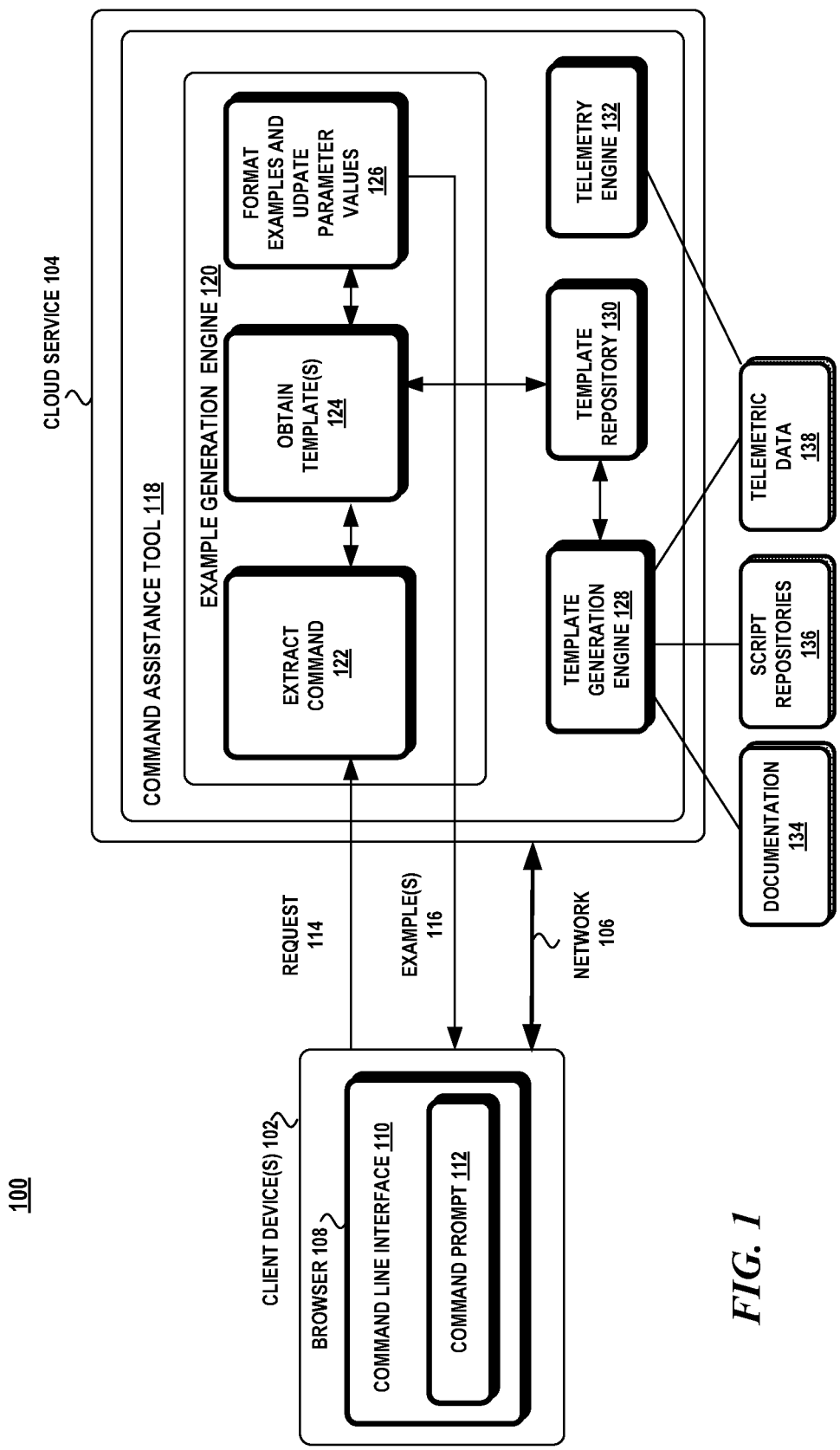
FIG. 1 illustrates an exemplary system for an automated command assistance of a cloud shell.

FIG. 1 illustrates a block diagram of an exemplary system 100 in which various aspects of the invention may be practiced. As shown in FIG. 1, system 100 includes a client device 102 communicatively coupled to a cloud service 104 through a network 106. The cloud service 104 includes a number of resources (e.g., applications, virtual machines, libraries, services, databases, storage, etc.) that are made available to one or more client devices 102 through the Internet. The cloud service 104 is composed of one or more third-party servers. Examples of a cloud service include Microsoft Azure, Google Cloud, and the like.

A client device 102 includes a browser or rich client application 108 that is configured to execute a command line interface 110. The command line interface (CLI) enables a user on a client device 102 to access resources on the cloud service through text-based commands. Commands are entered into a command prompt or input field of the CLI and transformed into Representational State Transfer (REST) Application Programming Interfaces (API)s. The REST APIs are service endpoints that support a set of HTTP operations or methods to create, retrieve, update, delete or access resources on the cloud service.

In order to facilitate usage of the command line interface 110, the cloud service 104 has a command assistance tool that provides examples of the correct syntax of a command to perform a particular function from a set of templates. The command assistance tool 118 generates the templates from different sources and uses the templates to respond to queries for assistance on the usage of a command.

A template is an example of the correct syntax of a command for an intended purpose. A command includes a command name and may include one or more sub-commands and/or parameters or arguments. There may be multiple templates for a command with each template having a different sequence of sub-commands and parameters. A parameter includes a parameter value. The template generation engine 128 generates the templates from various sources which include telemetric data, script repositories, and/or documentation. Telemetry data 138 is obtained from monitoring the usage of the commands at the cloud service 104 through a telemetry engine 132. The telemetry engine 132 monitors the commands that are executed in the cloud service 104 and generates usage patterns of its syntax.

The template generation engine 128 also obtains usage patterns from scripts stored in one or more script repositories 136 and from documentation 134. A script is a list of commands presented in a file written in a script programming language (e.g., JSON, JAVASCRIPT, HTML, XML, etc.) that are performed sequentially by an interpreter. A script repository 136 is a file archive and web hosting facility that makes available scripts or programs written in a scripting language. A script repository 136 includes external repositories, such as GitHub, BitBucket, CloudForge, and internal repositories, that are not publicly accessible, such as a script repository associated with the cloud service.

The template generation engine 128 also obtains command usage examples from various forms of documentation 134, such as online documentation. It should be noted that the disclosure is not limited to the sources described herein and that other sources may be used to obtain usage patterns of a command syntax.

The template generation engine 128 uses the usage patterns from the various sources to generate templates which are stored in a template repository 130. In one aspect, the template repository 130 may be implemented as a database of JSON objects accessible using an elastic search.

The command assistance tool 118 receives requests for command syntax examples from users of the cloud service. One or more examples are selected from the templates that are stored in the template repository 130. The requests are input through the command prompt in the client device 102 and transmitted to the cloud service 104. The example generation engine 120 extracts keywords from the request, obtains one or more templates matching the extracted keywords, updates the parameter values for the parameters in the template, if any and returns to the client device examples, based on the found templates.

Attention now turns to FIGS. 2A-2C which illustrate the command line interface for the Microsoft Azure cloud service. It should be noted that the disclosure is not limited to the commands and examples shown in FIGS. 2A-2C and that these examples are used to illustrate the teachings set forth herein.

Turning to FIG. 2A, there is shown an exemplary instruction requesting assistance with the syntax of the command az vm create 204. The command az vm create pertains to the creation of a virtual machine on the cloud service. In the example shown in FIG. 2A, the command prompt is the string $ az find which instructs the command assistance tool to find examples of the correct syntax associated with the command vm create. The command assistance tool responds with the response I'm an AI robot; Here are the most common ways to use [az vm create] 206.

Three examples are provided that reflect the most frequently used ways that the az vm create command is used. The first example 208 shows the correct syntax of the az vm create command:

az vm create -resource-group MyResourceGroup -name MyVirtualMachine.

In this example, the az vm create command specifies the creation of a virtual machine with the parameters --resource-group and --name. The character '--' denotes a parameter. Not all command may have a parameter. In this particular cloud service, resources are allocated within a resource management group that has its own name identified by the resource-group parameter having a default value, MyResourceGroup. The virtual machine is also identified by the name parameter whose default value is MyVirtualMachine.

The second example 210 shows another correct syntax of the az vm create command:

az vm create --n MyVM --g MyResourceGroup --image UbuntuITS.

In this example, a default Ubuntu virtual machine is created with automatic Secure Shell (SSH) authentication. An Ubuntu virtual machine is a virtual machine that runs the Ubuntu operating system. SSH is a cryptographic network protocol that is used to establish communications between the client and the cloud service. In this example, the --n parameter identifies the name of the virtual machine, MyVM, the --g parameter identifies the resource group, MyResourceGroup, and the --image parameter identifies the operating system, UbuntuITS.

The third example 212 describes the creation of a default Windows Server virtual machine with a private IP address: az vm create --n MyVM --g MyResourceGroup --public-ip-address " "--image Win2012R2DataCenter.

In this example 212, the command uses the name parameter, --n, to identify the name of the virtual machine, MyVM, the group parameter, --g, to identify the resource group, MyResourceGroup, the public IP address parameter, --public-ip-address, to identify a private IP address, " ", which is blank, and the image parameter, --image, to identify the operating system, Win2012R2DataCenter.

FIG. 2B illustrates a request for examples on how to use the az vm command. The request 222 takes the form $ az find vm. The az vm command has a large number of subcommands that are associated with it, such as az vm create, az vm show, az vm list, az vm encryption status, etc. In this instance, the command assistance tool provides the most frequently used subcommands that are associated with the az vm command. As shown in FIG. 2B, the automatic response: I'm an AI robot; Here are the most common ways to use [az vm] 224 is provided along with three examples.

The first example 226 indicates the syntax of the command to show the details of a virtual machine:

az vm show --name MyVirtualMachine --resource-group MyResourceGroup where the parameter, -name, identifies the name of the virtual machine, MyVirtualMachine, and the parameter, --resource-group, identifies the name of the resource group, MyResourceGroup.

The second example 228 indicates the syntax of the command for listing the details of a virtual machine:

az vm list -output table, where the parameter, --output, indicates that the details are to be formatted in a table.

The third example 230 indicates the syntax of the command to show the encryption status of a virtual machine:

az vm encryption show --name MyVirtualMachine -resource-group MyResourceGroup, where the parameter, --name, identifies the name of the virtual machine, MyVirtualMachine, and the parameter, --resource-group, identifies the name of the corresponding resource group, MyResourceGroup.

It should be noted that in the examples shown in FIGS. 2A-2B, the values for the parameters contain default values. For example, the name, MyResourceGroup, is the default value for the --resource-group parameter and the name MyVirtualMachine, is the default value for the -name parameter. The command assistance tool has the capability to include in the examples, personalized values for the parameters instead of the default values. The personalized values are those parameter values associated with known resources on a user on the cloud service. The personalize value can be ascertain by the command assistance tool issuing commands to obtain them or from tracking a user's telemetric data.

FIG. 2C illustrates examples where personalized parameter values are used instead of the default values. In FIG. 2C, a request is received for the az vm create command. In order to personalize the parameter values, the command assistance tool discovers the current values for the name and resource group parameters. This can be accomplished by the issuance of the az group list| head which returns the names of the resource groups the user has allocated 234. As shown in FIG. 2C, the user has two affiliated resource groups 236: clirg and clirg1, which are located in westus and have a status of succeeded. Once these parameter values are obtained, the command assistance tool uses the personalized parameter values in the examples.

The introductory message 240 is returned in response to the request 238. The first example 242 shows how to create an Azure virtual machine using the command syntax including the personalized parameter values: az vm create -g clirg -n webVM1, where the resource-group name parameter, -g, includes the personalized value, clirg, and the virtual machine name parameter, -n, includes the personalized value, webVM1.

The second example 244 shows how to create a default Ubuntu virtual machine with automatic SSH authentication with personalized parameter values:

az vm create -n webVM1 -g clirg -image UbuntuLTS, where the name parameter, --n, includes the personalized value, webVM1, and the resource-group parameter, --g, includes the personalized value, clirg.

The third example 246 shows how to create a default Windows Server virtual machine with a private IP address with personalized parameter values:

az vm create -n webVM1 -g clirg -public-ip-address " "--image Win2012R2DataCenter, where the name parameter, --n, includes the personalized value, webVM1, and the resource-group parameter, --g, includes the personalized value, clirg.

Attention now turns to a description of the template repository. In one aspect, the template repository is structured as a JSON array so that the array can be indexed. The JSON array can be searched using an elastic search that adds an inverted index to improve the speed of the template retrieval. Every field in the JSON array is associated with an inverted index. An inverted index contains a list of all the unique words that appear in the document and for each unique word a list of the documents in which it appears.

FIGS. 3A-3B illustrate an exemplary JSON array 300 that the command assistance tool generates to store the templates. As shown in FIG. 3A, this JSON array is a collection of name/value pairs for the group command, az vm. A group command is a command that has multiple sub-commands. The field 302, tag, identifies the array as pertaining to the values cli and azure. The answer field 304 is a description of the associated command. The children field 306 identifies the indices of the sub-commands associated with the group command, az vm. In this example, there are nineteen sub-commands represented with indices 1290 through 1307.

The question_keywords field 310 identifies keywords associated with this command, such as az vm. The id field 314 is an identifier and represents a value, 1308, used to search for this object. The question field 316 is the command for this object. The link field 320 contains the URL having additional information about the command.

FIG. 3B illustrates an exemplary JSON object for the az vm show subcommand associated with the az vm group command. The tag field 332 identifies that the classification that the object pertains to, such as cli. The answer field 334 identifies the description of the command. The question_keywords field 338 identifies keywords associated with the command, such as, az vm show, show, details, resource, and query. The link field 340 is empty but would contain the URL having additional information about the subcommand. The id field 342 represents a value, 1290, used to search for this object. The question field 344 contains a text string representing the correct syntax for the command. In this instance, the response in the question field contains frequently-used parameters for this subcommand, such as, --show-details, --name, --query, and -resource-group and corresponding default values, such as MyVM, and MyResourceGroup.

Methods

Attention now turns to a description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 4:
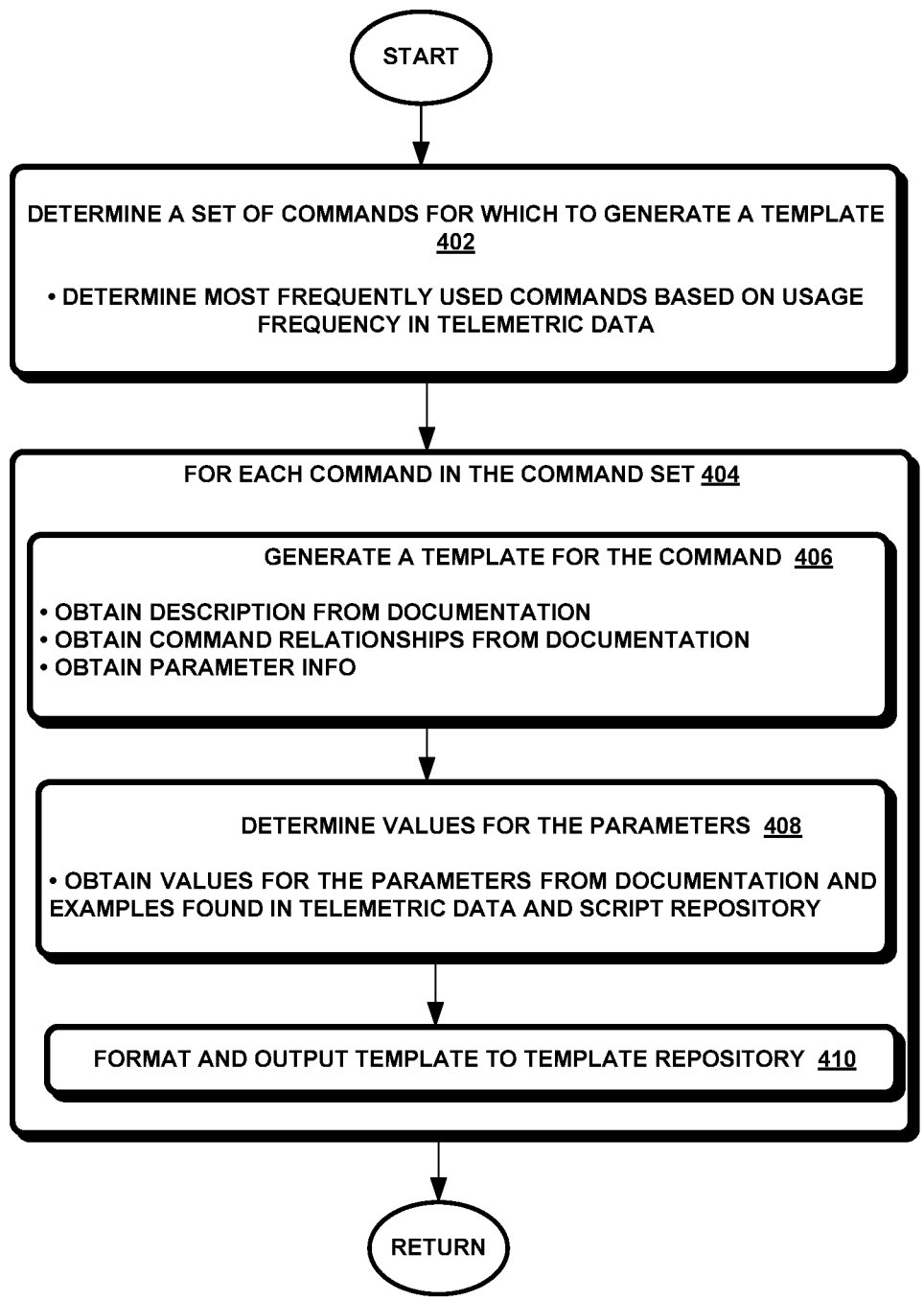
FIG. 4 is a flow diagram illustrating an exemplary method used to generate the templates.

FIG. 4 represents an exemplary method 400 for generating the templates. Referring to FIGS. 1 and 4, a template is generated for the most frequently-used commands (block 402). A template contains the data needed to respond to a request for the syntax of a command. A template is derived from usage patterns of the command. The sources for a template include user documentation, telemetric data, and/or script repositories. A telemetry engine 132 monitors the execution of the commands at the cloud service 104 and generates the telemetric data 138 from these commands. The template generation engine 128 scans the telemetric data 138 to determine the most frequently-used commands. There may be a frequency threshold used to limit the number of commands for which a template is generated.

For each command in the command set (block 404), the template generation engine 128 generates one or more templates for the command (block 406). The template may be constructed as a JSON object or array similar to what is described in FIGS. 3A-3B. The template generation engine 128 extracts data from various sources to construct the template with the data described above.

For example, a description of the command may be obtained from documentation. Relationships between commands, such as which is a group command and which are the sub-commands of a group command may be obtained from the documentation and input into the template. The parameters required for a command may be obtained from the documentation and from the telemetric data.

In some instances, a parameter may be optional and in other instances, a parameter may be required. The documentation may not describe the parameters needed for a command. In this instance, the template generation engine parses the programs or scripts in the script repository to obtain usage patterns of a command. It can be determined from these usage patterns whether or not a command requires a parameter or not and the number and types of parameters that are needed.

In some cases, a default value is used in the template as the value of a parameter. In other cases, the template generation engine 128 can determine a real value or personalized value for the parameter (block 408). The personalized value may be obtained from analyzing the documentation and from the scripts in the script repository (block 408).

The template generation engine 128 obtains the data for a command from the various sources and then inputs this data into a respective template (block 410). The template is then used to formulate a response to a query for the syntax of a command in the form of examples along with informative details. Attention now turns to FIG. 5 which shows an exemplary method 500 for generating the examples for a request.

Figure 5:
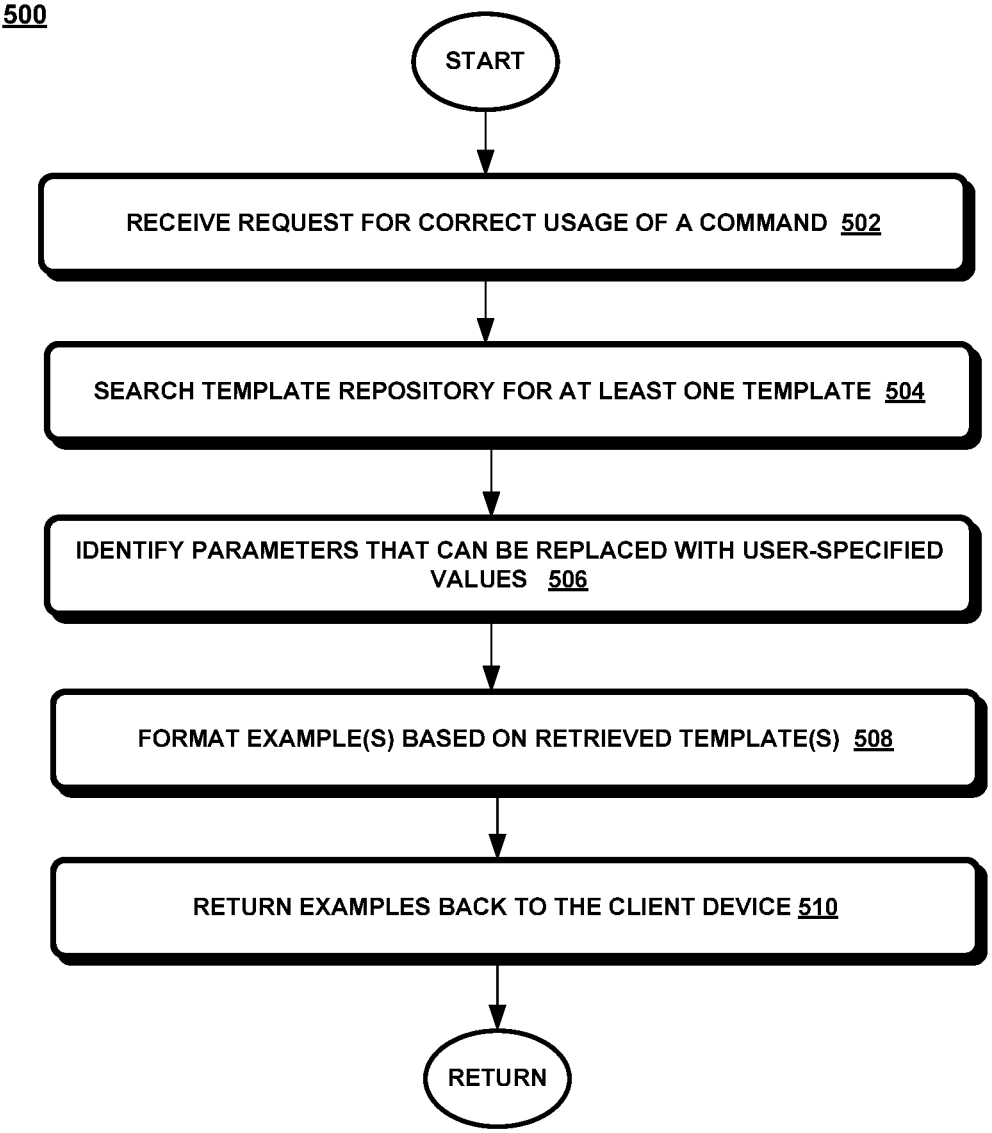
FIG. 5 is a flow diagram illustrating an exemplary method used to generate examples from one or more templates associated with a requested command.

Turning to FIGS. 1 and 5, a request comes from a user's client device 102 through a command line interface 110 that is displayed via the user's browser 108 (block 502). In the command line interface 110, there is a command prompt 112 through which the user requests assistance with the syntax of a command. The command prompt for the assistance may be in the form of the character "?" which is combined with the command az find and the name of the command. The command may be a group command that is associated with a number of subcommands. For instance, a group command may be az vm which has a number of subcommands, such as create, show, list, etc. The name of the command may be the group command (e.g., ? az find vm) or the group command combined with subcommands and/or parameters (e.g., ? az find vm create). In either case, the example generation engine 120 parses the request to extract out the command, which in this case is the text after az find.

The example generation engine 120 then searches for one or more templates matching the command (block 504). In one aspect, the example generation engine 120 uses an elastic search engine to perform a weighted elastic search on the JSON objects or templates to find one or more templates that have a close relevance to the target command.

An elastic search is a full text search that uses a Boolean model to find matching templates and a practical scoring function that generates a score for a template in order to rank the templates by relevance to the command at issue. The elastic search consists of an analysis phase and a relevance phase. In the analysis phase, each block of text is converted into an inverted index. In the relevance phase, a score is generated for each document which identifies how similar a full-text field is to the full-text query string.

A weighted elastic search gives more weight or relevance to documents based on certain fields of the JSON document. In one aspect, a weight is used to denote the importance of certain fields of the template than others. For example, referring to FIG. 2A, the index for the elastic search is based on the question_keywords field (i.e., az vm create) and the question field (i.e., az vm create-resource group MyResourceGroup-name MyVirtualMachine). The index will give more weight to question_keywords than questions. This can be done through a configuration file that specifies the weights as follows:

```
"weights": {
    "question_keywords": 6,
    "question": 3
}
```

When the cloud assistance tool uses the elastic search engine to search for az vm create, the elastic search engine will assign a high score to the template where az vm create occurs in the question_keyword field. The templates are returned in ranked order and the cloud assistance tool takes a predetermined number of templates to use as the examples.

The retrieved templates are then used to format the response with examples derived from the templates (block 506). For example, the response may include the formatted message, I'm an AI robot; Here are the most common ways to use [extracted command], where extracted command includes the command extracted from the request. In addition, for each template that is retrieved, the example generation engine 120 formats an example including a description which is taken from the answer field of the corresponding JSON object. The syntax of the command is taken from the question field of the corresponding JSON object.

Next, the example generation engine 120 replaces the default parameter values with personalized parameter values when the command has parameters (block 508). The question field may include default values for the parameters used in the command. The example generation engine 120 may obtain personalized values in place of the default values for a parameter. For instance, for the az vm create command, the example generation engine 120 issues an az find vm list command to obtain the name of a virtual machine that is allocated for the user and a resource-group name that is associated with the user. If these names exist, the example generation engine 120 substitutes these values in place of the default values of a parameter.

Upon completion of the formation of the examples, the example generation engine 120 returns the examples to the client device which are displayed in the command line interface (block 510).

Exemplary Operating Environment

Figure 6:
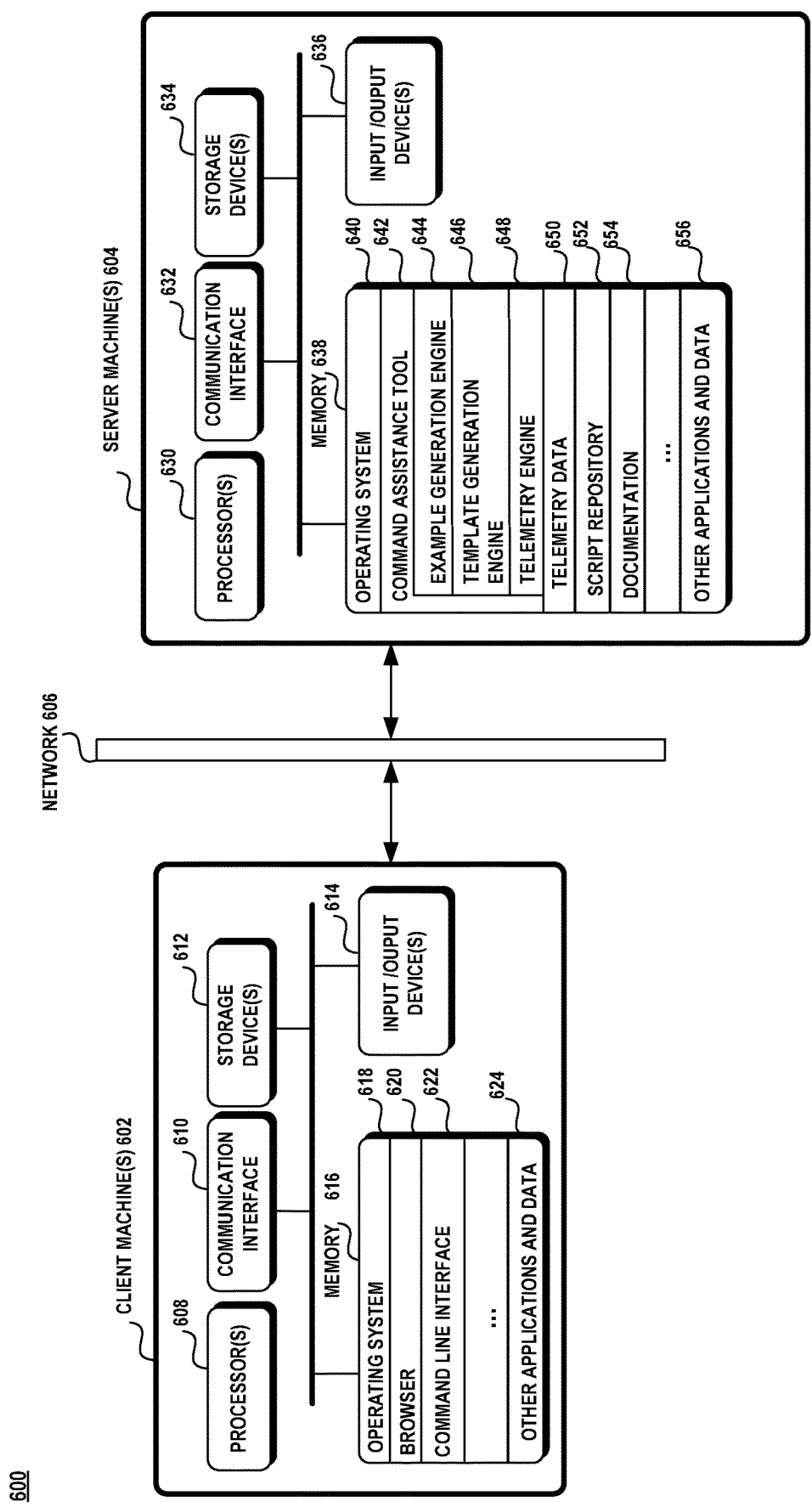
FIG. 6 is a block diagram illustrating an exemplary operating environment.

Attention now turns to a discussion of an exemplary operating embodiment. FIG. 6 illustrates an exemplary operating environment 600 that includes one or more client machines 602 connected to one or more server machines 604 through a network 606. The client machines 602 and the server machines 604 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 600 may be configured in a network environment, a distributed environment, a multi-processor environment, or a stand-alone computing device having access to remote or local storage devices.

A client machine 602 may include one or more processors 608, a communication interface 610, one or more storage devices 612, one or more input and output devices 614, and a memory 616. A processor 608 may be any commercially available or customized processor and may include dual microprocessors and multi-processor architectures. The communication interface 610 facilitates wired or wireless communications between the client machines 602 and other devices. A storage device 612 may be a computer-readable medium that does not contain propagating signals, such as modulated data signals transmitted through a carrier wave. Examples of a storage device 612 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 612 in a client machine 602. The input devices 614 may include a keyboard, mouse, pen, voice input device, touch input device, etc., and any combination thereof. The output devices 614 may include a display, speakers, printers, etc., and any combination thereof.

The memory 616 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 616 may also include one or more external storage devices or remotely located storage devices that do not pertain to propagated signals, such as modulated data signals transmitted through a carrier wave.

The memory 616 may contain instructions, components, and data. A component is a software program that performs a specific function and is otherwise known as a module, program, engine, and/or application. The memory 616 may include an operating system 618, a browser 620, a command line interface 622, and other applications and data 624.

A server machine 604 may include one or more processors 630, a communication interface 632, one or more storage devices 634, one or more input and output devices 636, and a memory 638. A processor 630 may be any commercially available or customized processor and may include dual microprocessors and multi-processor architectures. The communication interface 632 facilitates wired or wireless communications between the server machine 604 and other devices. A storage device 634 may be a computer-readable medium that does not contain propagating signals, such as modulated data signals transmitted through a carrier wave. Examples of a storage device 634 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 634 in a server machine 604. The input devices 636 may include a keyboard, mouse, pen, voice input device, touch input device, etc., and any combination thereof. The output devices 636 may include a display, speakers, printers, etc., and any combination thereof.

The memory 638 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 638 may also include one or more external storage devices or remotely located storage devices that do not pertain to propagated signals, such as modulated data signals transmitted through a carrier wave.

The memory 638 may contain instructions, components, and data. A component is a software program that performs a specific function and is otherwise known as a module, program, and/or application. The memory 638 may include an operating system 640, a command assistance tool 642 having an example generation engine 644, template generation engine 646, telemetry engine 648, telemetry data 650, script repository 652, documentation 654, and other applications and data 656.

The network 606 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

A system is disclosed having at least one processor and a memory. The at least one processor is configured to: obtain a set of one or more frequently-used commands that manage a resource of a cloud service; create at least one template for at least one command of the set, the at least one template including a usage pattern of the at least one command and at least one keyword associated with the at least one command, the usage pattern derived from historical usage of the at least one command, the usage pattern including a text string representing correct syntax of the at least one command; obtain a query from a command line interface, the query including a first command of the cloud service; perform a weighted full-text search for a first template having a high relevance to the first command based on a match of the first command to at least one keyword in a template; and generate an example of usage of the first command from the usage pattern of the retrieved template.

A usage pattern includes a text string including the at least one command and/or one or more subcommands and/or one or more parameters. The usage pattern includes at least one parameter associated with the at least one command and a default value for the at least one parameter. The usage pattern includes at least one parameter associated with the at least one command and a personalized value for the at least one parameter. At least one keyword is derived from historical usage of the at least one command. A personalized value is obtained from past usage of the parameter with the at least one command and/or from a current resource setting at the cloud service.

A method is disclosed comprising: obtaining a plurality of templates representing commands to manage a resource of a cloud service, a template including a text string representing syntax of a command, the text string including the command, and/or subcommand, and/or parameters, the template including one or more search indices representing the command; receiving a query for syntax of a first command from a command line interface associated with the cloud service; utilizing a full-text search on the plurality of templates to determine at least one relevant template based on at least one of the one or more search indices closely similar to the first command; and generating at least one example of the syntax of the first command based on the text string of the at least one relevant template. The command line interface operates under a browser of a remote computer.

The method further comprises generating a relevance score for each of the one or more search indices of a template and ranking the scored templates based on the relevance score. Additionally, the method comprises monitoring commands used on the cloud service; and determining a set of one or more frequently-used commands as well as generating the plurality of templates for the one or more frequently-used commands from user documentation and/or script code. The method also comprises obtaining a default value for a parameter of the text string from historical usage patterns of the command or user documentation in addition to obtaining a personalized value for a parameter of the text string from a current resource setting of the cloud service. The method performs settings a weight to each of the search indices; and generating a relevance score based on a weight applied to each of the search indices.

A device is disclosed comprising one or more processors coupled to at least one memory. The memory contains instructions that when executed on the one or more processors perform actions that: obtains a query for a syntax of a command from a command line interface, the command used to manage resources on a cloud service; performs a full-text search on a template repository for at least one relevant template, the template repository including a plurality of templates for one or more commands of the cloud service, a template having one or more searchable indices, at least one of the searchable indices including a text string representing syntax of the requested command; obtains one or more templates having one or more searchable indices that are closely similar to the requested command; and generates a response to the query showing an example of a syntax of the command based on the obtained one or more templates.

The at least one memory contains further instructions that: associates a weight to each of the one or more searchable indices; and determines relevance of each template in the template repository based on a weighted relevance score. The one or more searchable indices contain keywords found in the command. At least one of the one or more searchable indices includes a text string representing a usage pattern of the command. The usage pattern is derived from historical usage of the command from telemetric data, user documentation and/or script programs.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system, comprising:
   at least one processor and a memory;
   wherein the at least one processor is configured to:
   obtain a user request from a command line interface of a cloud service for an example illustrating correct usage of a first command of the command line interface;
   perform a weighted full-text search for a relevant template having a high relevance to the first command from a template repository, the template repository including a plurality of templates, a template corresponding to a command of the command line interface, a template having a plurality of fields, each field having a searchable index, one or more fields of a template associated with a weight, wherein the weighted full-text search searches each field of a template for the searchable index that matches text of the user request and computes a relevance score for each template, the relevance score based on a n accumulation of the weights of each field of a template that matches the text of the user request, wherein the weights are pre-configured; and
   generate the example of the correct usage of the first command from a template having a highest relevance score.

2. The system of claim 1, wherein the template represents a usage of a command having a unique combination of a command name, and/or one or more subcommands, and/or parameters.

3. The system of claim 1, wherein each field of the plurality of fields includes an answer, keywords, link, parameters, and/or parameter values.

4. The system of claim 1, wherein the user request includes a character indicating a request for the example.

5. The system of claim 1, wherein the at least one processor is further configured to:

obtain, from the relevant template, a default value for a parameter of the example, wherein the default value for the parameter is derived from historical usage patterns of the command and/or user documentation.

6. The system of claim 1, wherein the at least one processor is further configured to:
obtain a personalized value for a parameter of the example from a current resource setting of the cloud service.

7. A computer-implemented method, comprising:
providing a plurality of templates representing syntax usage of commands of a command line interface that manage a resource of a cloud service, a template including a plurality of fields associated with the syntax of a command, the template including a plurality of search indices, a search index associated with a select field of the plurality of fields, one or more fields having a weight denoting a level of significance of a field;
receiving a user request for syntax of a first command from the command line interface associated with the cloud service;
utilizing a weighted full-text search on the plurality of templates to find at least one relevant template to the first command, wherein the weighted full-text search searches each field of a template for a search index matching text of the user request and computes a relevance score for each template, a relevance score based on a n accumulation of weights of each field of a template matching the text of the user request, wherein the weights are pre-configured; and
generating at least one example of the syntax of the first command based on the at least one relevant template.

8. The computer-implemented method of claim 7, wherein the template represents a syntax of a command having a unique combination of a command name, one or more subcommands, and one or more parameters.

9. The computer-implemented method of claim 7, wherein the fields of the template include an answer, keywords, parameters, and/or parameter values.

10. The computer-implemented method of claim 7, wherein the user request includes a command prompt that includes a character indicating a request for the example.

11. The computer-implemented method of claim 7, further comprising:
obtaining, from the at least one relevant template, a default value for a parameter of the example, wherein the default value for the parameter is derived from historical usage patterns of the command or user documentation.

12. The computer-implemented method of claim 7, further comprising:
obtaining a personalized value for a parameter of the example from a current resource setting of the cloud service.

13. The computer-implemented method of claim 7, further comprising:
providing a link associated with the at least one relevant template, the link associated with additional information of the first command.

14. A device, comprising:
one or more processors coupled to at least one memory;
the at least one memory containing instructions that when executed on the one or more processors perform actions that:
obtain a user request for an example of correct usage of a command of a command line interface, the command used to manage a resource on a cloud service;
perform a weighted full-text search on a template repository for at least one relevant template for a first command, the template repository including a plurality of templates for commands of the cloud service, a template having a plurality of fields, each field having a searchable index, one or more fields having a weight, the weight reflecting a significance of the field, wherein the weighted full-text search searches each field of a template for a searchable index that matches text of the user request and computes a relevance score for each template, a relevance score based on an accumulation of weights of each field of a template matching the text of the user request, wherein the weights are pre-configured; and
generate a response to the user request, the response including an example based on the at least one relevant template.

15. The device of claim 14, wherein the plurality of fields includes a question keyword field, a question field, an identifier fields, and/or a link field.

16. The device of claim 14, wherein the example includes a command name, one or more subcommands, and one or more parameters.

17. The device of claim 14, wherein the response includes a link to a webpage containing information on the first command.

* * * * *